(12) United States Patent
Winter et al.

(10) Patent No.: US 10,883,236 B2
(45) Date of Patent: Jan. 5, 2021

(54) REINFORCED ELASTOMERIC BLADE

(71) Applicant: Winter Equipment Company, Willoughby, OH (US)

(72) Inventors: Kent Winter, Willoughby, OH (US); William A. Sulesky, Medina, OH (US)

(73) Assignee: Winter Equipment Company, Willoughby, OH (US)

( * ) Notice: Subject to any disclaimer, the term of this patent is extended or adjusted under 35 U.S.C. 154(b) by 0 days.

(21) Appl. No.: 16/221,015

(22) Filed: Dec. 14, 2018

(65) Prior Publication Data

US 2019/0112781 A1   Apr. 18, 2019

Related U.S. Application Data

(62) Division of application No. 15/143,020, filed on Apr. 29, 2016, now abandoned.

(60) Provisional application No. 62/160,681, filed on May 13, 2015.

(51) Int. Cl.
*B32B 3/10* (2006.01)
*E01H 5/06* (2006.01)
*B32B 7/12* (2006.01)
*B32B 17/04* (2006.01)

(52) U.S. Cl.
CPC ............... *E01H 5/061* (2013.01); *B32B 7/12* (2013.01); *B32B 17/04* (2013.01); *Y10T 428/24777* (2015.01); *Y10T 428/24802* (2015.01)

(58) Field of Classification Search
None
See application file for complete search history.

(56) References Cited

U.S. PATENT DOCUMENTS

| | | | |
|---|---|---|---|
| 4,014,969 A | 3/1977 | Gorter et al. | |
| 4,152,991 A | 5/1979 | Stedman et al. | |
| 4,543,140 A | 9/1985 | Price | |
| 4,623,419 A | 11/1986 | Price | |
| 4,833,801 A | 5/1989 | Winter | |
| 4,899,472 A | 2/1990 | Winter | |
| 4,978,999 A * | 12/1990 | Frankel | B29C 70/14 15/1.51 |
| 5,099,766 A | 3/1992 | Whitaker, Jr. | |
| 5,265,356 A | 11/1993 | Winter | |
| 7,665,977 B2 | 2/2010 | Price | |
| 7,703,600 B1 | 4/2010 | Price | |
| 7,836,615 B2 | 11/2010 | Winter | |
| 7,874,085 B1 | 1/2011 | Winter et al. | |
| 8,191,287 B2 | 6/2012 | Winter et al. | |
| 8,844,173 B2 | 9/2014 | Winter et al. | |
| 9,163,379 B2 | 10/2015 | Winter | |
| 2014/0373398 A1 | 12/2014 | Winter et al. | |
| 2015/0167474 A1* | 6/2015 | Tobin | F03D 1/0675 416/229 R |
| 2016/0069041 A1 | 3/2016 | Winter et al. | |
| 2016/0069047 A1 | 3/2016 | Winter | |

* cited by examiner

*Primary Examiner* — Christopher M Polley
(74) *Attorney, Agent, or Firm* — Fay Sharpe LLP

(57) ABSTRACT

The present disclosure provides for a reinforced elastomeric blade having a plurality of laminated layers. The laminated layers can include at least two layers of elastomeric material at least partially separated by a fiber reinforced laminate layer or an embedded metal layer.

20 Claims, 14 Drawing Sheets

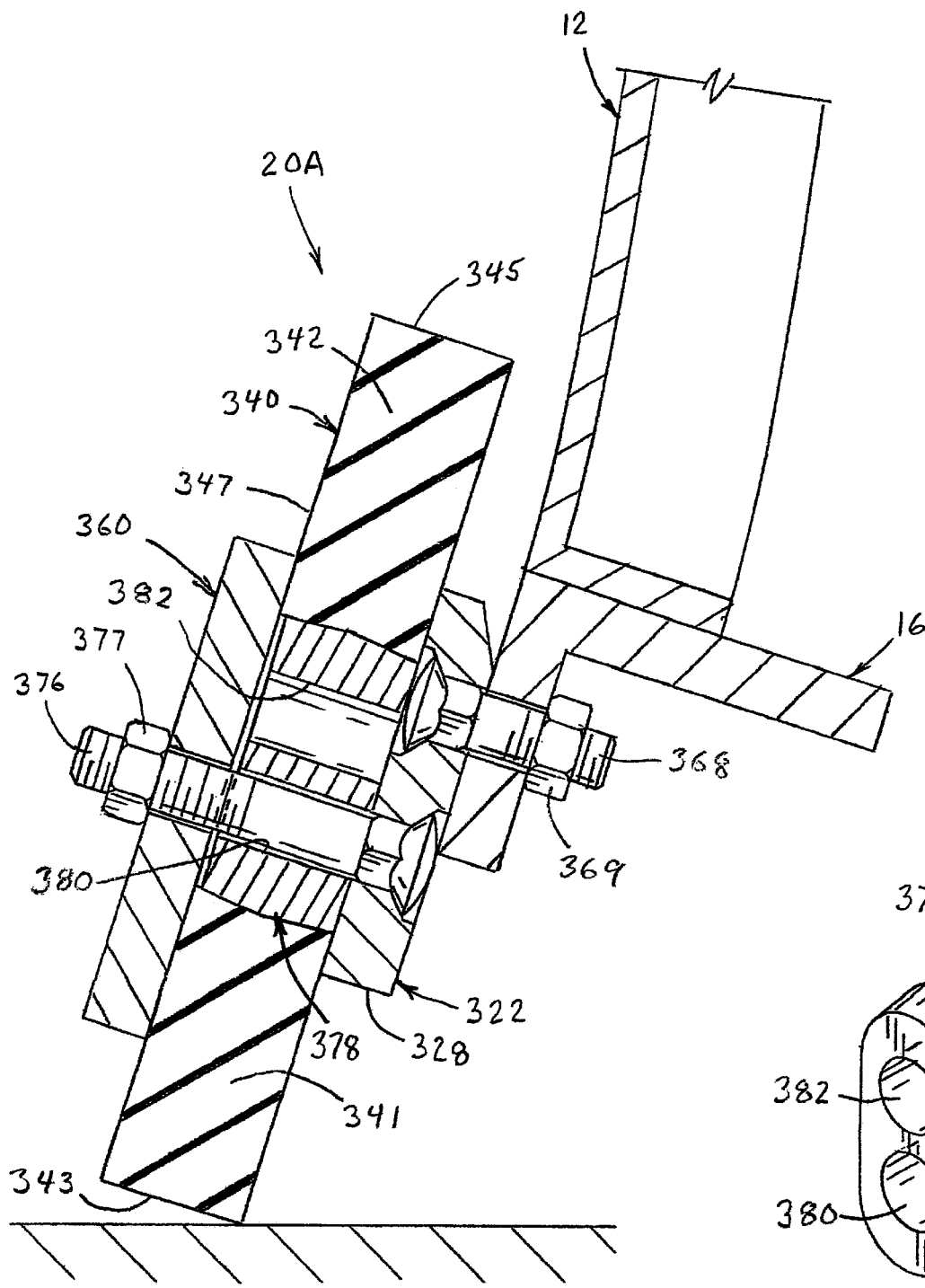
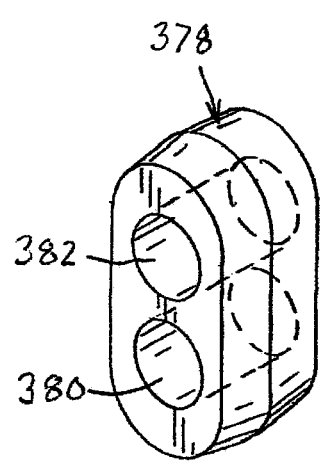
FIG. 5
FIG. 6

REINFORCED ELASTOMERIC BLADE

This application is a Divisional of U.S. Nonprovisional application Ser. No. 15/143,020, filed on Apr. 29, 2016, which claims the benefit of priority from U.S. Provisional Patent Application No. 62/160,681, filed on May 13, 2015, the subject matter of each of which is hereby incorporated herein by reference in its entirety.

BACKGROUND

The present disclosure relates generally to devices for improving the durability, performance, and operation of elastomeric blades as well as, methods of mounting elastomeric blades. Specifically, the present disclosure provides an improved elastomeric blade and method of making same, for example, snow plow edge and pusher box edge, and method for mounting and/or replacing. Additionally, the present disclosure relates to devices for improving the durability, performance, and operation of material conveying blades. Specifically, the present disclosure provides an improved elastomer blade and method of making same, for example, ballast or gravel conveying blade, broom, or wiper and method for mounting and/or replacing. Ballast conveying blades, brooms, and wipers can be used in the rail industry for distributing ballast between and under railroad ties along railroad track beds. Pusher box blades and brooms can be used for pushing material (i.e. garbage and waste products) along smooth surfaces typically encountered at transfer stations or inside warehouses.

Rough terrain and cold weather conditions have caused problems for snow plow blades for as long as there have been snow plows. Although many modifications and alternative designs have been made to snow plow blades in attempts to improve the life, durability, and performance of snow plow blades, in particular, the life, durability and performance of snow plow blade edges, most of these modifications and alterations did not provide sufficient durability and ride improving capabilities to deal with, among other things, the rough terrain and cold weather that snow plow blades are typically exposed to. Typically, prior art snow plow edges are metallic, for example, steel, and are excessively damaged or even destroyed due to wear from contact between the plow edge and the terrain, along with corrosion (which is exacerbated by road salt). Such prior art blade edges must frequently be repaired or replaced.

In addition, rigid prior art snow plow blade edges typically can damage the surface over which they are moved, for example, asphalt or concrete. Due to their rigidity, snow plow blade edges typically transmit loads, for example, shock loads to the vehicle, and vehicle mounting components to which the plow blade is attached. The aforementioned shock loads, in turn, are then transmitted to the driver of the vehicle. These loads can damage or incapacitate the vehicle or vehicle mounting components. In addition, the shock loads exacerbate a driver's dissatisfaction with the task of plowing. Furthermore, metallic prior art blade edges are not effective in plowing fluid-like or finely granulated media, for example, slush, water, and other fluids or powders. There is a need in the art to provide a snow plow blade edge which avoids these limitations of prior art plow blade edges, in particular, limitations in prior art snow plow blade edges.

The present disclosure describes a resilient construction material and method of mounting which can be used to provide new blade edges or replace worn blade edges, in particular, snow-plow blade edges, pusher box edges, and other conveyance (i.e. ballast) blade edges that overcome many of the limitations of the prior art.

The present disclosure further describes a new and improved method and apparatus for the fabrication of elastomeric molded articles or laminated bodies formed of fiber reinforced material or metal reinforced material, and also pertains to improved molded articles formed in accordance with the aforesaid method and through the use of the aforesaid apparatus constructions of this development. In its more specific aspects, the present invention, in one embodiment, relates to new and improved molded and layered articles formed of a first polymeric material containing embedded fibers which are essentially oriented (i.e. cross laminated) and a second material having a modulus of elasticity which deviates from that of the aforesaid first material, the articles produced by this invention being, by way of example, elastomeric blades, conveyor bands, or conveyance blades, and further, this invention pertains to a novel method and apparatus for the production of these molded articles or laminated bodies.

In another embodiment, the present invention relates to new and improved molded and layered articles formed of a polymeric material containing a scraping element. The scraping or reinforcing element can be embedded in the polymeric material or can be adjacent to an exterior face of the polymeric material. The embedded or laminate scraping element can be comprised of a mesh layer, screen layer, expanded metal, metal grating, perforated sheet steel layer, and/or solid steel layer. The perforated sheet steel can include shape perforated sheet steel. Further, the scraping element can comprise a plurality of partial inserts or one or more full inserts. The partial inserts can each include an area less than the elastomeric blade surface area. The full insert can include an area generally equivalent to the surface area of the elastomeric blade.

It is known to form molded articles from elastomeric materials by injection molding or extrusion in molds. In this respect it is also here mentioned that reinforcement inserts can be placed into the mold prior to the injection molding or extrusion operations. In order to overcome the need for such additional operational procedures, it is proposed to introduce into the mixture reinforcement elements, for instance, in the form of short glass fibers, textile, metallic yarns, mesh, screen, expanded metal, metal grating, solid sheet steel, and/or shape perforated sheet steel. The insert(s) can be injected or laminated into the mold and the resultant mixture thus containing fibers, yarns, metal inserts, or the like. When using this procedure it is possible to fabricate strand-like or continuously molded articles, since in both cases a flow operation occurs in which individual parts of the material carry out a relative movement with respect to one another. The yarns or fibers can be placed in essentially parallel orientation relative to one another with regard to the flow direction. In other words the fibers may be oriented when introduced. Hence, there is obtained a molded article, which owing to the oriented fibers, is improved in respect of its strength characteristics in the direction of fiber orientation whereas it possesses a lower strength in a direction perpendicular to such fiber orientation direction. In a great number of cases, however, it is also desired for certain reasons to have different strength characteristics prevail at different sections of the molded article. Thus, in one embodiment, strategically positioned and dimensioned inserts can provide different strength characteristics at different sections. Strength consistency is desired for a great many molded articles, for example, similar strength throughout all portions or sections of the body or article. Thus, in other embodiments, a random orientation of fibers is desired in order to have consistent strength characteristics at all sections of the molded article.

BRIEF DESCRIPTION

Hence, it is an object of this invention to fulfill in a most reliable and effective manner the previously mentioned varying strength characteristics throughout different portions, sections, or layers of a molded article.

Another and more specific object of the present invention is to provide a new and improved method of fabricating molded articles by means of which these desired different strength characteristics can be obtained and wherein each such molded article possesses two or more portions, sections, or layers having different direction of orientation of the fibers, or different materials, or the like.

The strength of a fiber reinforced material or a polymeric material, in which fibers are embedded, is dependent upon a number of parameters, among which there should be mentioned especially the quantitative relationship and strength values of the plastic and fiber material respectively, the obtained adherence between both materials and, in particular, upon the relationship of the orientation of the fibers with respect to the direction of loading of the molded article.

In order to achieve special effects, such as for instance a certain uniform elasticity of the molded article with respect to tensile loads in a certain direction, it can be particularly advantageous if two or more layers formed of the first polymeric material containing fibers of the second material are bonded into a layered material having at least two different orientation directions or a random orientation.

Previous attempts have been made for different fields of application to impart strength in certain directions by embedding in the polymeric material forming the base mass continuous yarns or filaments, such as twisted or cord layers, bunched together cord packages, and fabric layers. However, there always resulted a more or less pronounced anisotropic effect which produced an irregular force distribution, and therefore, viewed in its entirety, generally required a more extensive or expensive construction in order to be able to take up certain loads. In contrast thereto, with the inventive molded articles even when taking into account the different portions or sections with different orientation direction of the embedded fibers, with the sections viewed projected into substantially a common plane, the force distribution is much more favorable, even if the specific strength of the composite assembly is less since the much thinner fibers taking-up the forces are more uniformly distributed.

The inventive molded article can be fabricated in that the individual portions or sections of the molded article, each of which contains fibers formed of the second material embedded in a predetermined uniform orientation direction in the first polymeric material, can be connected with one another in a known manner, for instance by winding together, adhesive bonding or the like. However, it has been found to be particularly advantageous if at least one portion or section of the molded article, containing embedded fibers oriented in one direction, is subjected to an intentional flow in a flow direction deviating from the original orientation direction of the fibers. This flow direction can be, for instance, produced in that the article section where the fiber orientation should be changed, is subjected to a tensile and/or compressive load in the deviating direction. A re-orientation can also then be obtained if the material of the relevant section is subjected to relative movement, for instance, with the aid of mold elements which are moved relative to one another, away from one another, or towards one another, or is subjected to an intentional shearing action. In so doing, the new orientation can be achieved, for instance, by carrying out a displacement towards one another of superimposed material layers.

The first polymeric material used in fabricating the inventive molded article or body can be formed of practically any optional and known plastic- or rubber matrix. It is however already known to fabricate plates with embedded staple fibers having an oriented direction of the fibers by drawing plastic- or rubber mixtures containing fibers into plates at a calender or by extruding such mixtures at an extruder by means of a wide mouth nozzle. In both cases there takes place, depending upon the processing viscosity of the first polymeric material, the thickness of the plates and the stiffness of the fibers, a more or less complete orientation of the staple fibers in the flow direction and perpendicular to the roller nip or gap. It has been found that the fiber orientation becomes that much better and extends that much more completely the lower the viscosity of the polymeric material and the smaller the roller gap (or the smaller the dimension of the wide mouth nozzle) and the stiffer the fibers. On the other hand, each fiber, the greater its stiffness, is subjected to an increased destruction by tearing or rupture at the kneading or mixing machine if the polymeric material possesses a relatively high viscosity. Therefore, it has been found to be advantageous to fabricate the molded articles from two such materials, wherein there is combined as high as possible modulus of elasticity of the fiber material and as low as possible Mooney plasticity and viscosity of the polymeric material at its processing temperature. This is especially so if, then, as just mentioned at least one section or portion of the molded article is intended to be subjected to a further flow operation. A particularly advantageous manifestation of the invention is realized if there is used as the polymeric material a so-called "liquid rubber," such as for instance polybutadiene with hydroxyl groups, cross-linked with isocyanate; or polybutadiene with carboxyl groups, cross-linked with epoxy resins. When using such polymeric material, which first then solidifies after having been molded, it is possible to orient fibers of greater stiffness and length by suitable flow operations without causing such to break or to rupture.

However, it is also possible to obtain for the inventive molded articles the two different orientation directions of the fiber material or the like if, during or after filling of the mold, the corresponding article portions or sections are subjected to different flow directions and/or shearing action, the latter for instance by carrying out suitable relative movement of the mold surfaces with respect to one another.

Fibers which are more flexible, as for instance rayon, even if subjected to the same orientation treatment are not aligned or oriented as well as stiff fibers. However, under certain circumstances stiff fibers, such as for instance those formed of polyester, owing to their greater mechanical strength are nonetheless better able to withstand the mixing and kneading operations than flexible rayon fibers.

It is then also possible to use as the polymeric material rubber mixtures formed on the basis of natural rubber, resulting in the advantage that such mixtures can be produced with a fiber content exceeding 10% by weight, preferably 20 to 40% by weight, and possess the required green strength in order to be able to be drawn into plates at the calenders.

In the event portions or sections of the molded article are not to be subjected at a later time to further flow operations, rather there takes place an assembly together of article portions with different fiber orientation, then it has been found to be advantageous to use cut mixtures on the basis of 70 parts by weight natural rubber and 30 parts by weight styrene butadiene rubber, which are not as sensitive with regard to heat, and, if desired, can be pre-vulcanized before they are worked into molded articles. As a result, it is no longer possible for there to occur any subsequent change in the fiber orientation during the further mechanical processing of the molded article.

In order to obtain the previously mentioned green strength while still, however, affording an inexpensive and good processable mixture, it is possible to utilize a mixture formed on the basis of 50 parts by weight natural rubber, 20 parts by weight polybutadiene rubber and 30 parts by weight oil extended styrene butadiene rubber. Then through the addition of nitroso compounds in a conventional manner it is possible to improve the workability so that the mixture can be exceedingly well drawn at the calender.

In the event that the inventive molded article is constructed as an elastomeric blade then, as already mentioned, it is possible to form the individual layers, previously conventionally consisting of rubberized cord, now as polymeric material containing oriented fibers and in known manner to wind such up into elastomeric blade blanks.

It can be advantageous also to select one or a number of sections, portions, or layers having different fiber orientation and simultaneously possessing different hardness, as for instance is the case for an elastomeric blade possessing layers or a material of greater hardness, for instance containing fibers with approximately 90 Shore A.

Further it has been found to be advantageous if the ratio of the moduli of elasticity in the fiber orientation direction, and transverse thereto, lies in a range between 30:1 and 200:1, preferably between 50:1 and 100:1.

Suitable for use with the inventive molded articles are not only fiber materials such as the already mentioned polyester or rayon fibers, rather also those formed of yarn, polyamide, glass, metal or the like. The strength-elongation relationship of the organic fibers and therefore indirectly their rigidity as well as the breaking or rupture load of a yarn can be seen from the following table:

| Type of yarn | Strength of the pure fiber in g/den | Elongation % | Breaking load of a base yarn (once twisted) of 3.3 den |
|---|---|---|---|
| Polyester | 8 | 9.4 | 26 |
| Nylon 66 | 9 | 16.5 | 30 |
| Nylon 6 | 8 | 18 | 26 |
| Rayon | 5.4-5.9 | 11.4 | 18-19 |

Polyester fiber or yarn, glass fiber, and/or metallic filament are stiffer owing to their increased modulus and therefore can be oriented easier. As already mentioned owing to its increased stiffness it tends to break into smaller pieces much more easily during the mixing operation if its increased strength were not to counteract such. When utilizing the previously mentioned liquid rubber it is however possible, according to the invention, to produce molded articles which have quite advantageous properties.

The adherence of the fibers, especially in relation to rubber polymers, can be achieved in conventional fashion and, for instance, can be improved by the addition of agents which split off formaldehyde in conjunction with finely divided silicic acid fillers.

Hence, according to a further manifestation of the invention there is proposed an apparatus for carrying out the inventive process wherein a hollow mold possesses at least one auxiliary compartment from which introduced material can be displaced by means of, for instance, a movable mold section or element constructed as a piston, into the hollow mold compartment which initially is still free of material. It is advantageous if at least one section of the hollow mold can be moved at an angle to the oriented fibers of the material located in the hollow mold, essentially parallel to the material surface in contact with such mold section.

It is also contemplated by the teachings of this invention to change the orientation direction during or after the flow operation in that, at least one mold section is movable in the peripheral direction with respect to the remaining mold sections. Owing to these measures it is possible to obtain at such regions an exact fiber orientation in the peripheral direction.

In a further aspect of the invention, it can be advantageous also to select one or a number of sections, portions, or layers having different materials, for example, laminated or embedded metal inserts. The inserts or laminates can be formed from expanded metal, metal grating, mesh, screen, and/or shape perforated sheet steel.

BRIEF DESCRIPTION OF THE DRAWINGS

FIG. 5 is a cross-sectional view taken along section lines 5-5 in FIG. 4;

FIG. 6 is a perspective view of a first mounting bushing;

DETAILED DESCRIPTION

Figure 1:
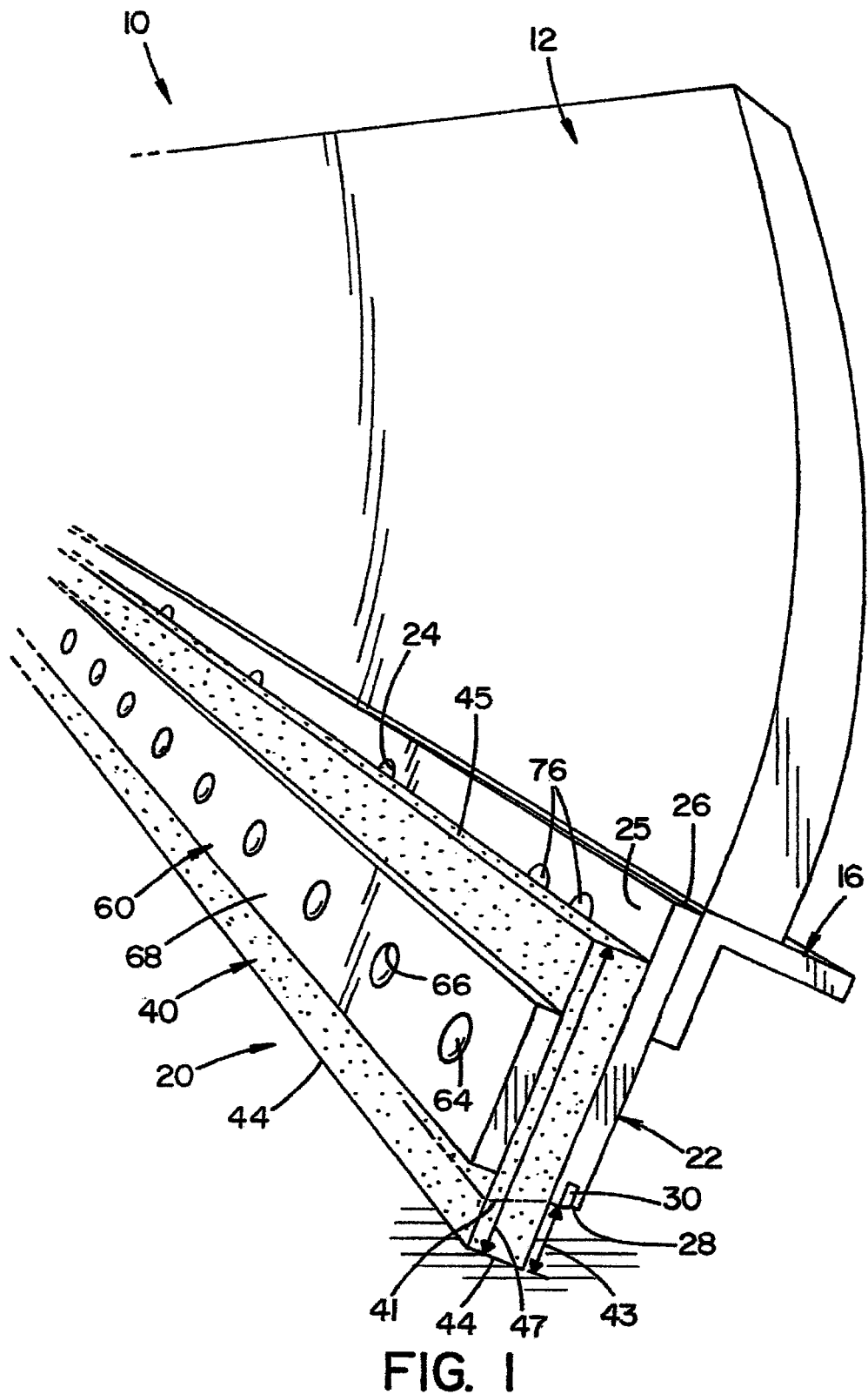
FIG. 1 is a perspective view of a plow blade according to a first embodiment of the present disclosure.
Figure 2:
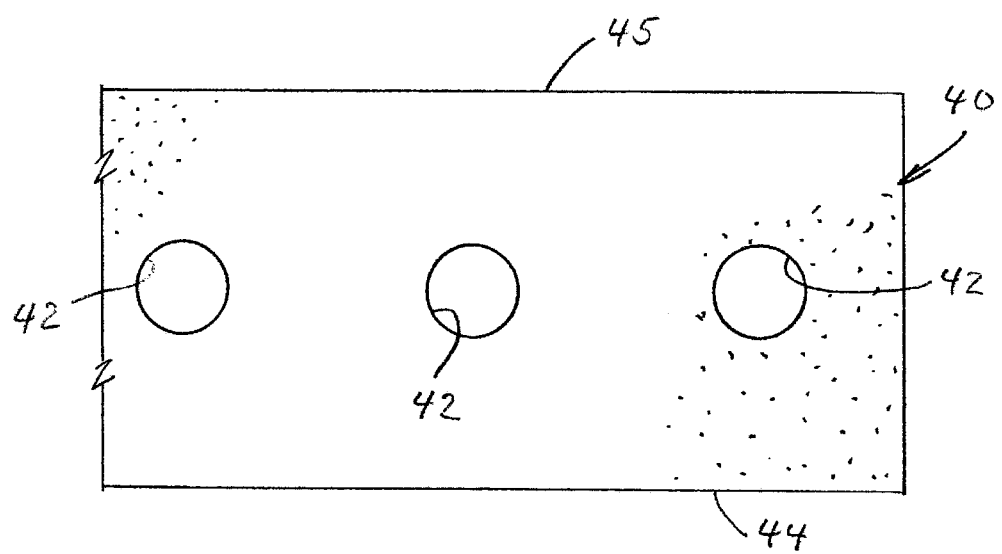
FIG. 2 is a plan view of an elastomeric blade.

Referring to the figures, wherein a perspective view is shown of a plow assembly 10 displaying one aspect of the present disclosure. The plow assembly 10 includes a plow body 12 which is typically of hemispherical and funnel shaped steel construction for deflecting snow or other media.

Plow assembly 10 is typically attached to a vehicle (not shown) by means of an appropriate frame or housing (also not shown). The vehicle may be any vehicle ranging from a standard car or pickup truck to a sand and salt-carrying dump truck to a road grader having a belly-mounted blade, to huge earth-moving or snow-moving plows, and to other ballast conveying machines. The means of attaching the plow body 12 to a vehicle may also typically include some form of hydraulic mechanism for positioning plow body 12 as desired, as is typical in the art. The plow assembly 10 may also include one or more reinforcing members to provide strength and rigidity to plow body 12. Reinforcing members are typically standard structural angles which are attached to the back of plow body 12, for example, by means of welding.

The plow assembly 10 can include at least one replaceable (or non-replaceable) plow body edge or mold board 16 mounted to the base of plow body 12 where edge 18 will contact the plowed surface, for example, a road surface. Mold board 16 is usually replaceable since its rigid construction is typically prone to damage due to abrasive contact with the surface being plowed or to obstacles, for example, pot holes, sewer covers, trees, mail boxes, and the like, encountered while plowing. Mold board 16 is typically of metallic construction, for example, steel construction, and is mounted to body 12 by a plurality of mechanical fasteners, for example, a plurality of nuts, bolts, and washers (not shown). Mold board 16 typically includes slotted perforations to allow for adjustment of the mounting of the mold board 16 during initial installation or for adjustment of the mounting of the mold board 16 after use and wear.

Referring again to the figures, a plow blade edge system 20 is therein displayed. Namely, an adapter blade 22 can be mounted to the mold board 16 of the plow body 12. The mold board 16 can be in a damaged or used condition. The adapter blade 22 includes mounting holes 24 aligned along a top edge 26 for securing to the mold board 16. The adapter blade 22 can be from about ¼ inch thick to about 1¼ inch thick and can be made from steel or similar materials. A bottom edge 28 along the adapter blade 22 can include high grade imbedded carbide inserts 30 along at least a portion thereof. To be described in more detail hereinafter, as a rubber blade 40 wears, or is damaged, the adapter blade 22, specifically the carbide inserts 30 along the bottom edge 28, act as a backup to resist wear until the rubber blade 40 can be flipped or replaced. It is to be appreciated that the adapter blade 22 can turn a damaged mold board 16 into a solid mounting surface for the rubber blade 40 or to protect a new mold board 16. In addition, the adapter blade 22 includes a series of bushings 34 aligned proximal to the bottom edge 28. The bushings 34 can be welded 35 to the front face 25 of the adapter blade 22. The bushings 34 provide a mounting arrangement for the rubber or elastomeric plow blade or edge segments 40. The bushings 34 provide a stable mounting platform that holds the plow edge segment 40 in a fixed position for ease of attachment between the adapter blade 22 and a clamp bar 60.

The dimensions of adapter blade 22 will vary depending upon the size of plow body 12 used, for example, the length of blade 22 is limitless, but reinforcing blade 22 typically will have a length from about 3 to about 12 feet. The width or height of blade 22 can be between about 3.0 to about 12.0 inches. For some exemplary embodiments, the length of individual segments of the adapter blade 22 can be 3, 4, 5, and/or 6 feet. In this manner, any combination of two, or three, blade segments can be combined to extend across plow blade 12 having a length of 6, 7, 8, 9, 10, 11 or 12 feet, or greater.

The elastomeric plow edge segment(s) 40 can comprise styrene butadiene rubber (SBR), polyurethane, polyethylene, polystyrene, and rubber. The elastomeric plow edge segment 40 can be pre-drilled, punched, or molded, including apertures 42 aligned with the bushings 34 of the adapter blade 22. The elastomeric plow edge segment 40 includes two mounting positions such that when first installed in a first position, a first edge 44 is presented to the road surface below. After the first edge 44 has worn to wear line 41, the elastomeric plow edge segment 40 can be dismounted from the plow blade edge system 20, reversed, and remounted such that the elastomeric plow edge segment 40 now is in a second position which presents a second edge 45 to the road surface below. Although not shown, it is to be appreciated that the second edge 45 can wear to a second wear line. Each wear line can be up to about 25% of the overall width or height of edge segment 40. More particularly, the distance 43 from the initial edge 44 to wear line 41 can be about 25% of the overall initial width 47 of plow edge segment 40. In this manner, the overall wear of edge segment 40 can be up to about 50% of the initial width. In one embodiment, the overall wear (i.e. width reduction) of edge segment 40 is from about 28% to about 50% after both edges 44, 45 have worn to their respective wear lines. Thus, the elastomeric plow edge segment 40 enables an extended life for improved performance and a decrease in material cost.

Figure 3:
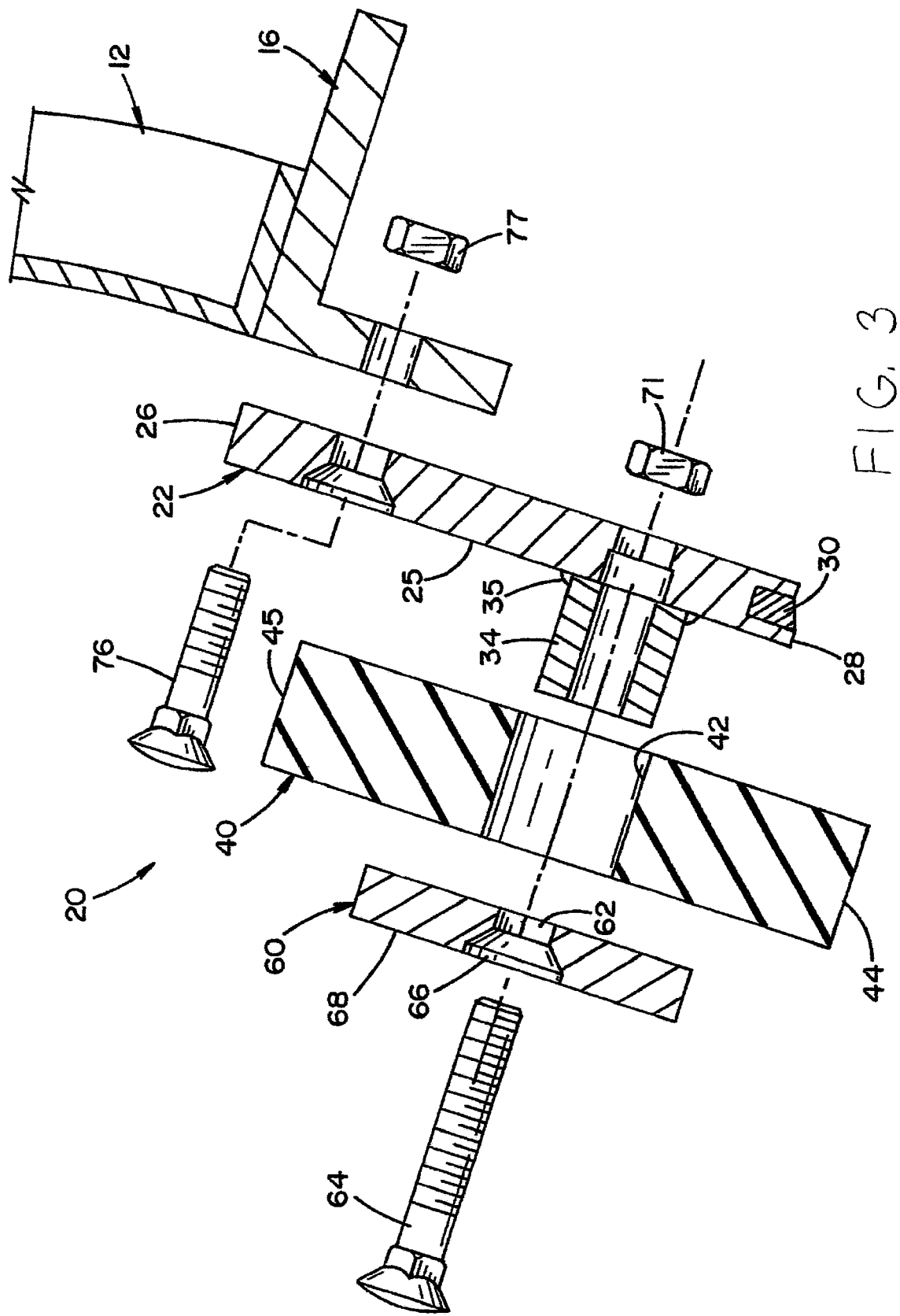
FIG. 3 is an exploded cross-sectional view of FIG. 1.
Figure 4:
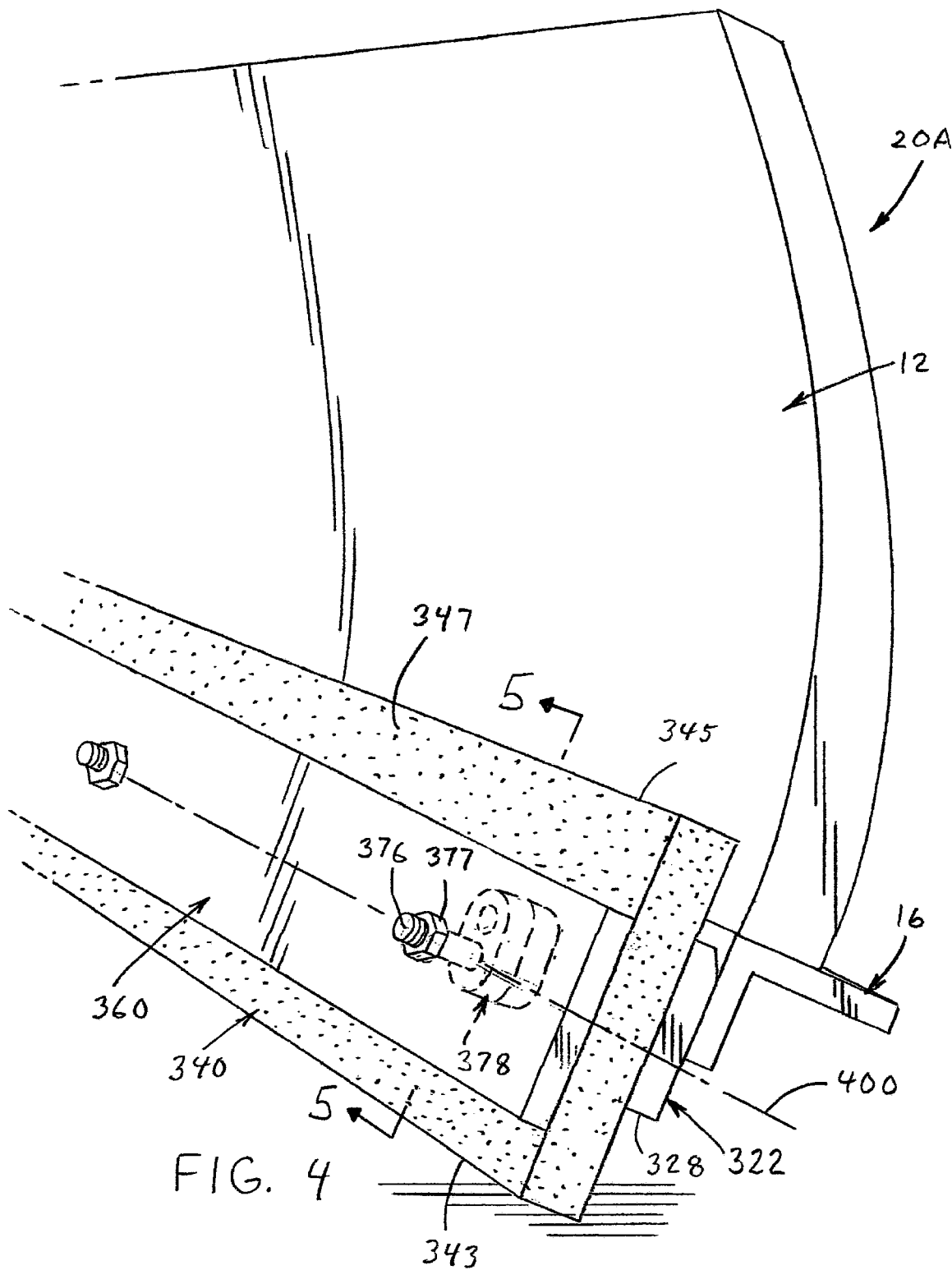
FIG. 4 is a perspective view of a plow blade according to a fifth embodiment of the present disclosure.

As shown in FIG. 3, the plow blade edge system 20 can be attached to the plow body 12 in a number of arrangements. A means of mechanical fastening, for example, a plurality of nuts 71, 77 and bolts 64, 76 as shown in FIG. 3 can be provided to fasten the clamp bar 60 to the adapter blade 22. The clamp bar 60 includes a series of holes 62 that align with the holes 42 and bushings 34 in the elastomeric plow edge segments and adapter blade segments, respectively. The clamp bar 60 gives support to the elastomeric plow edge segment 40 when plowing and provides a mechanism for keeping the elastomeric plow blade 40 firmly in place. It is to be appreciated that the clamp bar 60 can be reusable and provides a quick and easy method for changing or flipping the elastomeric blade 40 from the first position to the second position. The dimensions of the clamp bar 60 will vary depending upon the size of the plow edge used, for example, the length of clamp bar 60 is limitless, but clamp bar 60 typically can have a length from about 3 to about 12 feet. The width or height of clamp bar 60 can be from about 3.0 to about 7.0 inches. The thickness of clamp bar 60 can be from about 0.250 inches to about 1.250 inches. Exemplary lengths include 3, 4, 5, and 6 foot segments. As described above, any number of combinations of these exemplary lengths can be used to accommodate varying sizes of plow body 12.

Referring to FIG. 3, a first mounting arrangement kit 20 is therein shown and can include a plow bolt 64 extending through a countersunk hole 66 in a first side 68 of the clamp bar 60. As shown, the first side 68 of the clamp bar includes countersunk holes 66 about the mounting holes 62. The plow bolt 64 and nut 71 secures the clamp bar 60 with the adapter blade 22.

It is to be appreciated, that the elastomeric plow edge segment 40 can comprise any variety of heights and a variety of lengths. The dimensions of elastomeric blade 40 will vary depending upon the size of plow body 12 used, for example, the length of plow edge segment 40 is limitless, but edge segment 40 typically will have a length from about 3 feet to about 12 feet. The width or height of blade 40 can be from about 4.0 inches to about 12.0 inches. The thickness of blade 40 can be from about 0.50 inches to about 3.0 inches. The blades can comprise from about 2 to about 8 laminated layers (to be described in detail hereinafter). Exemplary embodiments include elastomeric plow blade segments 40 of 3, 4, 5, and 6 foot lengths. In this manner, any combination of two, or three, blade segments 40 can be combined to extend across mold board 16 of 6, 7, 8, 9, 10, 11, and 12 foot lengths, or greater. The aforementioned lengths of plow edge segments 40 provide ease of handling and ease of mounting to the adapter blade 22. The plow edge segments 40 can be easily handled and mounted by one person. The plow edge segments 40 can be planar or linear in orientation. In this manner the plow edge segments 40 retain a flat and planar orientation for ease of mounting. Elastomeric plow blade members heretofore known typically comprise segments cut off from a coiled storage means. A coiled configuration presents difficulties in trying to straighten and mount a curled or curved elastomeric plow blade segment.

Yet still another embodiment of a plow blade assembly 20A is shown in FIGS. 4-7, wherein an elastomeric plow edge or blade segment 340 can comprise a rectilinear shaped, or similar, configuration. The dimensions of elastomeric blade 340 will vary depending upon the size and type of plow body 12 used, for example, the length of plow edge segment 340 is limitless, but edge segment 340 typically will have a length from about 3 feet to about 4 feet. The width or height of the blade 340 can be from about 4.0 inches to about 12.0 inches. The thickness of blade 340 can be from about 0.50 inches to about 3.0 inches. Exemplary embodiments include elastomeric plow blade segments 340 of 3, 4, 5, and 6 foot lengths having 6.0 inch to 8.0 inch height, and 1.0 inch to 2.0 inch thickness. In this manner, any combination of two or more blade segments 340 can be combined to extend across plow bodies 12 having 6, 7, 8, 9, 10, 11, and 12 (et al.) foot lengths. To be described in more detail hereinafter, the aforementioned lengths of plow edge segments 340 provide ease of handling and ease of mounting with an adaptor blade 322 to mold board 16. The components in the plow edge kit 20A can be easily handled and mounted by one person. The plow edge segments 340 can be stacked, and staggered, one upon the other in a storage orientation. In this manner, the mounting faces of the plow edge segments 340 retain a generally planar or flat orientation for improved storage and handling arrangements, ease and efficiency of mounting, and improved performance. To be described hereinafter, the present disclosure provides a method of forming the elastomeric blade 340.

A means of mechanical fastening can be provided to fasten a clamp bar 360, the elastomeric blade 340, and an adaptor blade 322 to the mold board 16. The clamp bar 360 can include a series of holes 380, 382 that align selectively with the plurality of holes and bushings in the elastomeric plow edge segments 340, adaptor blade 322 segments, and the mold board 16, respectively. The bar 360 gives support to the elastomeric plow edge segment 340 when plowing and provides a mechanism for keeping the elastomeric plow blade 340 firmly in place. During mounting, the clamp bar 360 can be held in place adjacent to elastomeric bar 340 by mounting tabs (not shown). Opposing mounting tabs can be located on distal ends of the bar 360 to provide a temporary holding mechanism by placing the tabs in corresponding mounting holes (not shown) in elastomeric bar 340.

Plow blade edge or assembly kit 20A can be attached directly to mold board 16 as a complete system by means of mechanical fasteners, for example, a plurality of bolts 376, nuts 377, and plugs or bushings 378, as shown in the figures. Adaptor blade 322 can include a plurality of mounting holes 325, 326. Mounting holes 325 can be counter sunk and used for mounting the elastomeric blade 340 and the clamp bar 360 to the adaptor blade 322. Mounting holes 326 can be counter-sunk and provide the means, along with bolts 368 and nuts 369, for mounting the adaptor blade 322 to the mold board 16. It is to be appreciated that the adaptor blade 322 can come in varying lengths (i.e. 3, 4, 5, and 6 feet). The mounting holes 325, 326 can be equally spaced along the plow component segments.

Figure 7:
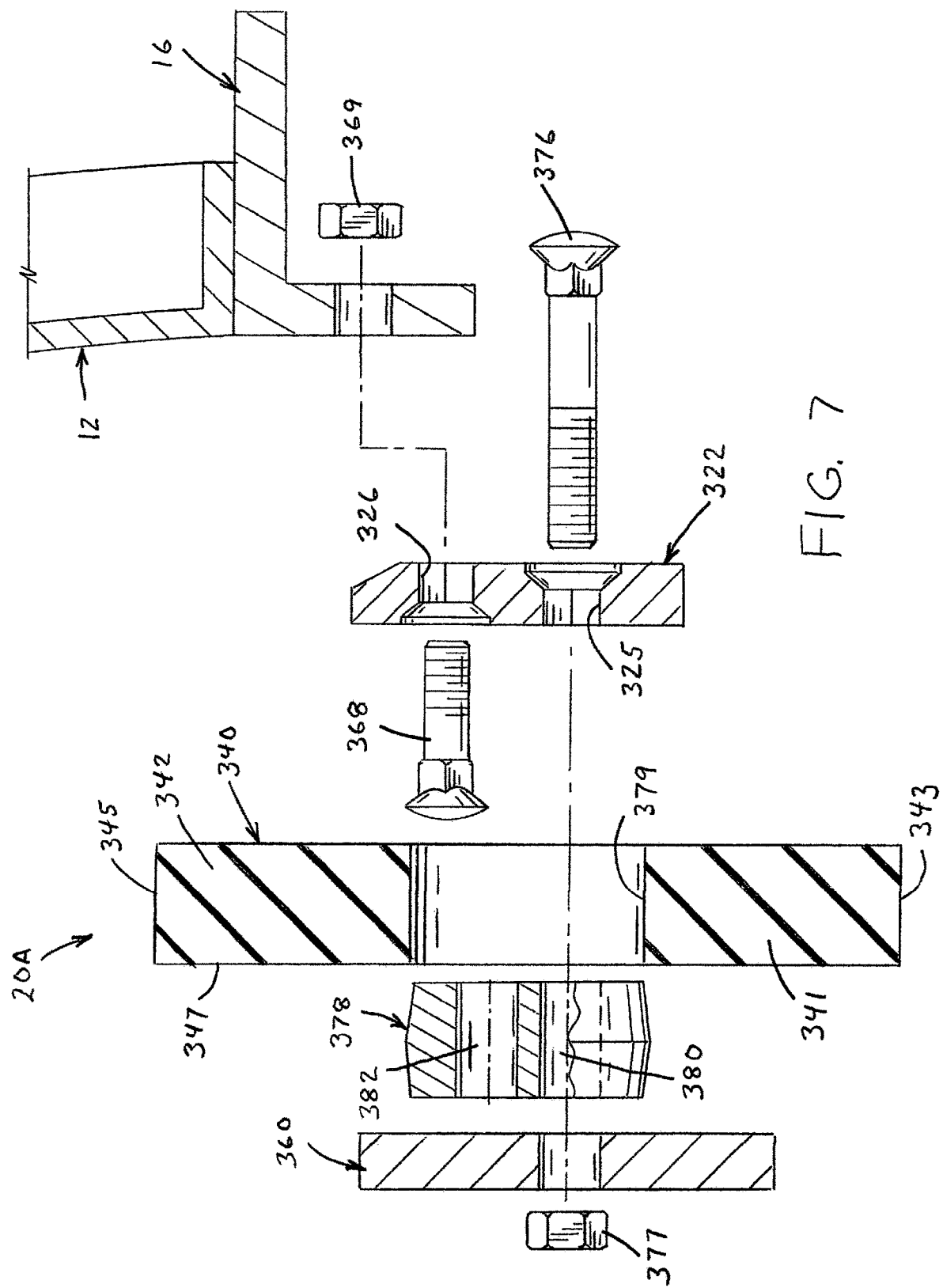
FIG. 7 is an exploded cross sectional view of a plow blade according to a fifth embodiment of the present disclosure.

Elastomeric blade 340 can include a slotted opening 379 for retention of the plug or bushing 378. As shown in FIG. 7, a plurality of slotted openings 379 are provided for retaining a plurality of bushings 378. Each bushing 378 can include at least two independent mounting holes 380, 382. The independent mounting holes provide adjustable mounting positions of the elastomeric blade 340 and the clamp bar 360. It is to be appreciated that independent mounting holes 380, 382 provide alternative mounting positions and a means for lowering the elastomeric blade 340 relative to the adaptor blade 322 as the elastomeric blade 340 is worn along a lower or working edge. It is to be further appreciated that a first mounting position 380 can be used for initial mounting of the elastomeric blade 340. As wear occurs to a bottom edge 343 of the elastomeric blade 340, the mounting of said elastomeric blade 340 can be moved to a second mounting position 382.

The clamp bar 360 can be easily removed and turned or flipped over which provides a quick and easy method for changing the position of and/or flipping the elastomeric blade 340 from one position to another position, while also providing another mounting position for clamp bar 360. As discussed above, the dimensions of elastomeric blade 340 and clamp bar 360 will vary depending upon the size of plow edge used, for example, the length of bar 360 is limitless, but bar 360 typically can have a length from about 3 feet to about 12 feet, preferably from about 3 feet to about 6 feet.

It is to be appreciated, that in use, elastomeric blade 340, and leg 341, will wear to the point that a bottom edge 343 of blade 340 will be proximal to a bottom edge 328 of adaptor blade 322 (in one mounting position). In this manner, edges 343 and 328 will generally be proximal to, or in contact with, the road or underlying surface. On one side, a length wise edge can comprise edge 343 proximal to the road or underlying surface. On another opposing side, and in another mounting orientation, a length-wise edge can comprise edge 345 proximal to the road or underlying surface (not shown).

It is to be appreciated that bar 340 can be mounted in at least four different positions and assembled with the clamp bar 360 and adaptor blade 322, and then mounted on mold board 16. A first position comprising mounting holes 380 include face 347 facing outward and edge 343 in a downward position. A second position includes face 347 facing outward and edge 343 in a downward position while utilizing the second mounting holes 382. A third position includes face 347 facing outward and edge 345 in a downward position while utilizing mounting holes 382. A fourth position includes face 347 facing outward and edge 345 in a downward position while utilizing mounting holes 380. The elastomeric blade 340 can thus be rotated length-wise to position each edge 343, 345 in two different positions, respectively, in order to enable even wear and to extend the life of elastomeric blade 340. The adaptor blade 322 can be premounted to mold board 16 and the assembly of plow blade edge kit 20A to simplify the changing of position of the elastomeric blade 340 as the blade 340 is worn along the respective edges 343, 345.

The bottom or working edges of the clamp bar 360 and adaptor blade 322 can provide hardened surfaces for engaging and disturbing hardened material (i.e. packed snow and ice) that are in the path (i.e. upstream) of the moving plow. The aforementioned arrangement provides the benefits of having hardened edges for breaking up material, and selectively presentable elastomeric blade edges 343, 345 for removing fluids and quieting the plow. The combination of hardened edge surfaces sandwiching edges 343, 345 provide the functional advantages of improving the movement of solid and fluid materials in the path of the plow blade while quieting and reducing the impact forces therefrom. Edge surfaces of the clamp bar 360 and the adaptor blade 322 can provide hardened edges upstream and downstream from edges 343, 345 thus providing the benefits of durability and wear resistance, while maintaining the benefits of an elastomeric edge.

Mounting holes can be aligned along the respective bars and blades 322, 340, 360 for receiving bolts 368, 376 and for mounting to mold board 16. The elastomeric blade 340 can be temporarily held in place by mounting bushings 378 and bolts 376 which can be aligned with corresponding mounting holes in elastomeric blade 340. The mounting bushings 378 are retained inside corresponding countersunk mounting openings 379 in elastomeric blade 340 for temporary retention to elastomeric blade 340. It is to be appreciated, that during mounting, bolts 376 can be passed (in turn) through adaptor blade 322, elastomeric blade 340, and clamp bar 360. Nuts 377 can then be fastened to bolts 376 for securing components 360, 340, 322 together.

Figure 9:
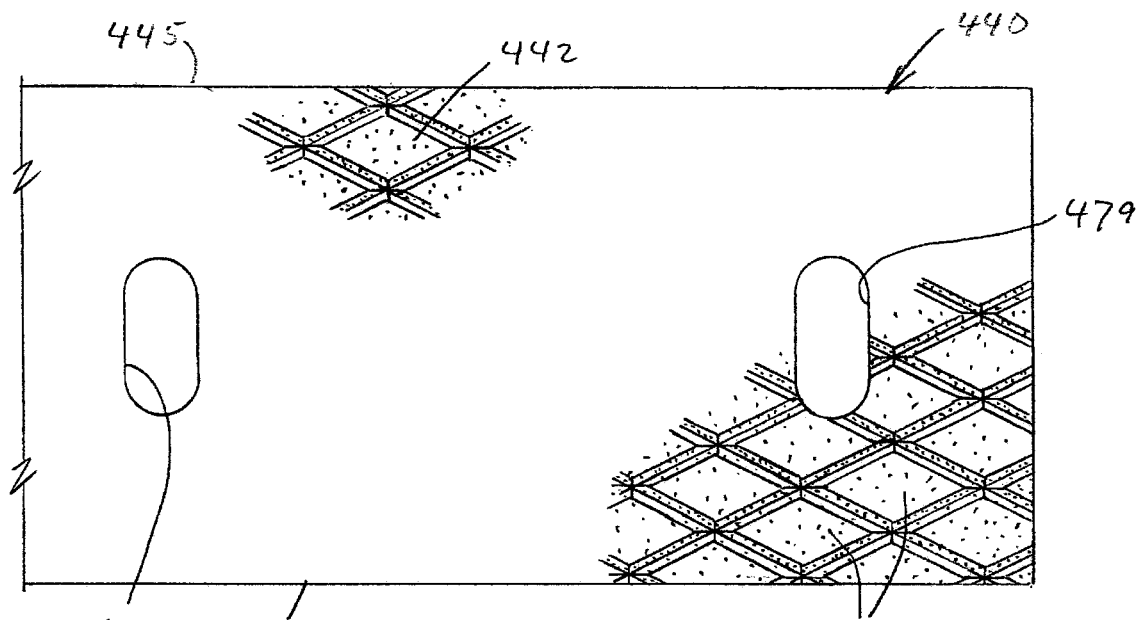
FIG. 9 is a plan view of an elastomeric blade respectively.
Figure 10:
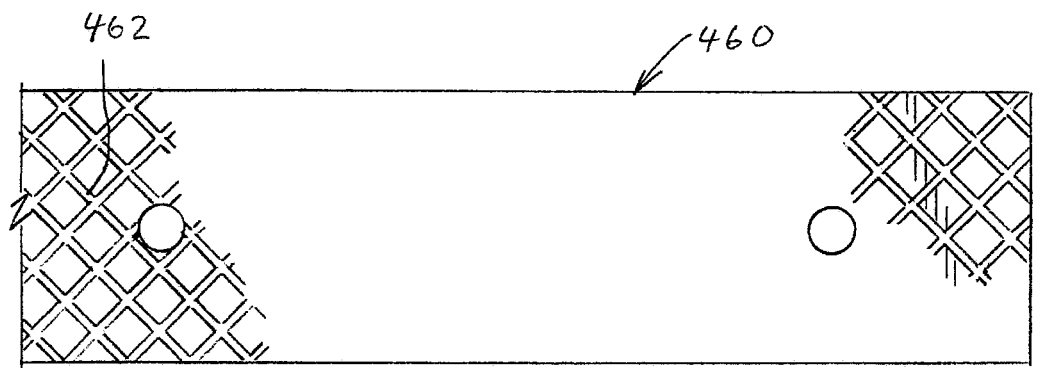
FIG. 10 is a plan view of a clamp bar respectively.

As shown in FIG. 10, it is to be appreciated that a clamp bar 460 can be turned or flipped over which provides a quick and easy method for changing or flipping an elastomeric blade 440 (FIG. 9) from the first through the fourth positions. The clamp bar 460 can include a textured surface 462 on at least one face or both faces of the clamp bar 460. The textured surface 462 can include ribbing, texturing, diamond patterning, stud welding, cleating, knurling, et al. The textured surface 462 of the clamp bar 460 adheres to (i.e. 'grabs') the adjacent or mating surface 442 of blade 440 and provides for an increased surface area adhesion and friction between the adjacent surfaces of the clamp bar 460 and the elastomeric blade 440. In particular, the area below and around the mounting bushing 378 and mounting bolt 376, due to the increased surface adhesion, will have increased resistance to shearing, stretching, and tearing of the area of the elastomeric blade 440 around the mounting openings 479. It is to be appreciated that the increased friction, adhesion, or 'grab' of the mating surfaces of the clamp bar 460 and the elastomeric blade 440 distributes the shear forces evenly across the entire length of the blade 440. The result is a reduction to the concentrated forces pulling and stretching the blade 440 downward and away from mounting bolt 376 and mounting opening 479.

Figure 8:
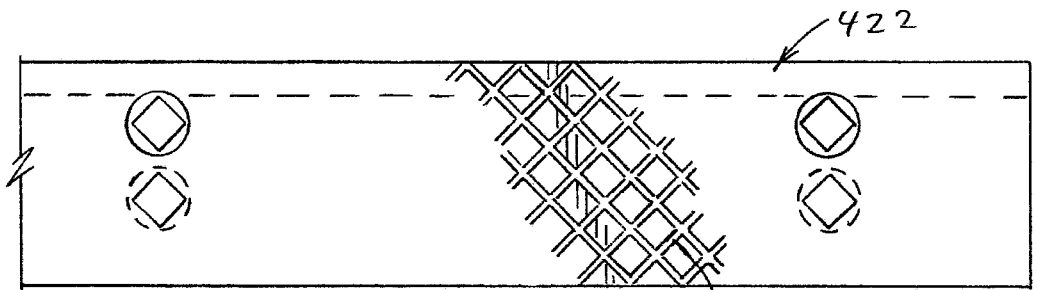
FIG. 8 is a plan view of an adapter blade respectively.

In a similar manner, an adaptor blade 422 (FIG. 8) can also include a textured surface adjacent to the elastomeric blade 440. The textured surface can include ribbing, texturing, diamond patterning, stud welding, cleating, knurling, et al. The textured surface 424 of the adaptor blade 422 adheres to or 'grabs' the adjacent or mating surface of blade 440 and provides for an increased surface area adhesion and friction between the adjacent surfaces of the adaptor blade 422 and the elastomeric blade 440. In particular, the area below the mounting bushing 378 and mounting bolt 376, due to the increased surface adhesion, will have increased resistance to shearing, stretching, and tearing of the area of the elastomeric blade around the mounting openings 379. It is to be appreciated that the increased friction, adhesion, or 'grab' of the mating surfaces of the adaptor blade 422 and the elastomeric blade 440 distributes the shear forces evenly across the entire length of the blade 440. The result is a reduction to the concentrated forces pulling and stretching the blade 440 downward and away from mounting bolt 376 and mounting opening 479. The combination of textured surfaces on both the clamp bar 460 and the adaptor blade 422 provides for increased adhesion on both the front and rear sides of elastomeric blade 440 thereby providing increased resistance to pulling, stretching, and/or shearing of the blade 440 away from the mounting bushing 378 and mounting bolt 376.

In one mounting position, one portion of the plow segment 440 can extend below clamp bar 460 and adaptor blade or plate 422, and another portion can extend above the clamp bar 460 and adaptor blade 422. The sandwiched elastomeric blade 440, i.e. sandwiched between selectively textured clamp bar 460 and selectively textured adaptor blade 422, associated with the mounting arrangement, reduces the "skipping" and stretching of the elastomeric blade 440 as the blade assembly is pushed across a surface. Adaptor blade 422, provides additional support to the back side of elastomeric blade 440 as the blade assembly is pushed across a surface. The alternative mounting arrangements and positions reduces the "moment arm" and distributes the shear forces of the elastomeric blade 440 about and along an entire mounting axis 400, and between respective mating surfaces of the adaptor blade 422, elastomeric blade 440, and clamp bar 460, while the assembly is engaged with and pushed along a surface. This reduction in "moment arm" and distribution of shear forces further reduces "skipping" and stretching of the elastomeric blade 440 while the blade edge 443 or 445 is engaged with and pushed along a surface.

Figure 11:
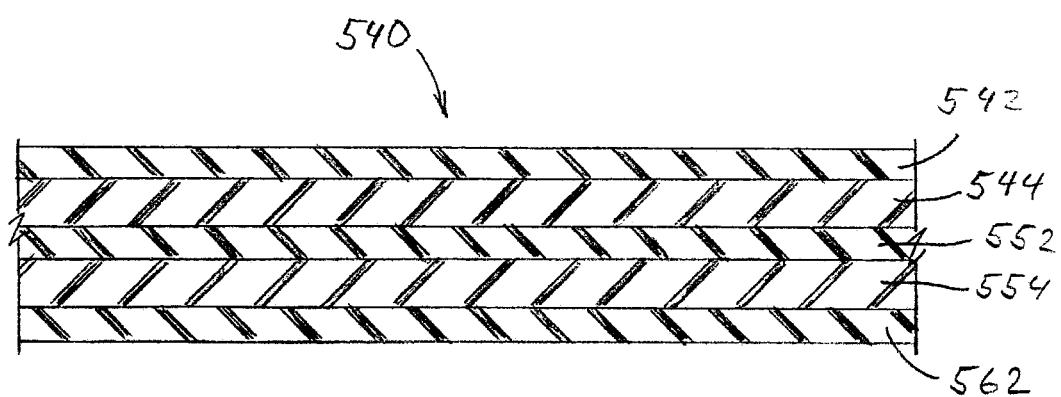
FIG. 11 is a sectional view of a conveyance blade produced in accordance with the invention; and, FIG. 12 shows elastomeric conveyance blades or portions thereof as produced in accordance with the teachings of this invention.

Further in accordance with this invention, an elastomeric blade 540 (FIG. 11) is provided for plow blade edge systems which provide for improved longitudinal and lateral reinforcement and improved wear resistance while retaining sufficient flexibility to permit the blade to flex. Specifically, the elastomeric blades 540 of this invention can have a laminated structure comprising a plurality of elastomeric layers including a plurality of fiber reinforcement layers embedded within or laminated therebetween. The blade material in this arrangement results in a multiple layer structure including fibers distributed substantially throughout the length and width of the elastomeric blade 540.

It is an object of the present invention to provide an elastomeric blade 540, and method of forming same, comprising at least a first rubber, or similar, layer 542 having an upper surface and a lower surface, a second rubber, or similar, layer 552 having an upper surface and a lower surface, a third rubber, or similar, layer 562 having an upper surface and a lower surface where the second rubber layer 552 is disposed between the lower surface of the first rubber layer 542 and the upper surface of the third rubber layer 562. The elastomeric blade can further comprise at least a first fiber reinforced layer 544 disposed between the first rubber layer 542 and the second rubber layer 552, and a second fiber reinforced layer 554 disposed between the second rubber layer 552 and the third rubber layer 562. Although not illustrated, it is to be appreciated that the elastomeric blade can comprise at least a fourth rubber, or similar, layer including at least a third fiber layer disposed between the third rubber layer and the fourth rubber layer.

The at least first, second, and third rubber layers 542, 552, 562 can be initially unvulcanized such that the assembled laminate of at least three rubber layers 542, 552, 562 and at least two fiber reinforced layers 544, 554 described above can then be subsequently vulcanized using methods and equipment employed in the manufacture of rubber conveyer or transport belts. The tackiness of unvulcanized rubber will help to hold the layers in place during assembly, and vulcanization of the rubber layers 542, 552, 562 and fiber reinforced rubber layers 544, 554 will cause all of the individual layers to become a single monolithic body of rubber with the intermediate layers 544, 554 of fiber reinforcement embedded therein.

To be described in more detail hereinafter, the elastomeric blades 340, 440, 540 can be manufactured from materials which are readily available and inexpensive and can be processed by layered conveyor belt or plow blade manufacturing means such as adhesive joining or vulcanization. The methods of processing elastomeric blades 340, 440, 540 described herein increase the wear resistance of the material, while at the same time, decrease stretching and tearing of the elastomeric blade as the blade is pushed along a road, or similar surface.

Describing now the method of forming the elastomeric blade 340, 440, 540 by way of example, it is to be appreciated the method includes use of a hollow mold embodying two mold halves for the outside surfaces of the side walls of an elastomeric blade. Within these mold portions there can be arranged a mold core. The mold halves can be equipped at the shoulder region of the elastomeric blade with ring-shaped compartments concentrically disposed with respect to the elastomeric blade axis. Within the compartments, there can be arranged ring-shaped pistons which can be moved in the axial direction of the elastomeric blade towards the hollow elastomeric blade mold. The work surfaces of these pistons form a portion of such hollow elastomeric blade mold.

At the beginning of the elastomeric blade fabrication operation there are inserted into the compartment of the hollow elastomeric blade mold, a first elastomeric or rubber layer, and for the purpose of fixing such in position there can be provided any suitable and therefore non-illustrated support devices. There is then inserted a material (preform) web having fibers, filaments or the like, oriented in the peripheral direction of the article. Thereafter, pistons can be displaced towards the interior of the hollow elastomeric blade mold, so that additional material flows into the regions of the side walls of such hollow mold.

At the elastomeric blade shoulder region the fibers, following completion of the flow operation, are essentially in a random orientation so that a good transition zone is achieved. The above process can be repeated at least one or two more iterations.

For all the embodiments disclosed herein the dimensions and number of layers is dependent upon the desired laminate structure of the individual blade sections. For instance, the fibers or the like can be oriented in two superimposed layers in different directions so that there is obtained an approximately crosswise oriented assembly. In the case of elastomers which can be vulcanized, the hollow elastomeric blade mold can simultaneously serve as the vulcanization mold. A different orientation of the fibers at different elastomeric blade sections or portions can also be obtained by orienting fiber layers with appropriate differently oriented embedded fibers.

Elastomeric blade construction can embody one to four fiber reinforced layers. By virtue of this arrangement it is possible to construct the individual fiber layers so as to be thinner so that during fabrication it is possible to obtain a better orientation of the embedded fibers. The layers themselves can be produced in a well-known fashion by injection molding or calendering so that the degree of the fiber orientation is dependent upon the processing speed (flow velocity) and upon the cross-section.

In another embodiment, the exterior walls of the rubber mixture can include fibers, so that there can be obtained at the surface regions of the monolithic elastomeric blade structure improved surface shear, tear, and stretch resistance.

Now with reference to another embodiment of an elastomeric blade (not illustrated), beveled or chamfered arrangement can be molded by providing partial layers which possess a different width with respect to one another and are arranged in superimposed fashion so as to form a substantially step-shaped transition zone. The orientation direction of the fibers in this layer arrangement can be different throughout the monolithic blade structure.

Furthermore, by specially designing the hollow elastomeric blade mold, for instance by providing different designs for the dimensions and/or shapes, it is also possible in accordance with the teachings of this invention to produce asymmetrical elastomeric blades.

A first phase of the process includes layering and inserting semi-finished products for forming the monolithic elastomeric blade into the mold. The ends of this semi-finished product are located at the auxiliary compartments of the mold in which there can be displaceably arranged pistons or slide-shaped elements or sections.

During the second manufacturing step of phase these movable elements can be displaced towards the hollow compartment of the mold so that the working surfaces of these movable elements form at their terminal position portions of the hollow mold. The ends of the semi-finished product are displaced into the remaining hollow portion of the mold, resulting in a reorientation of the fibers.

Finally there will now be presented certain exemplary illustrations of specific examples for the purpose of even more fully explaining the teachings of the present invention:

Example 1

A natural rubber mixture is mixed in a kneader with 20% by weight polyester fibers having a length of 80 millimeters and possessing a titre in the range of from about 2.3 den to about 4.3 den. From this mixture there are drawn plates at the calender and such can be vulcanized in a conventional way.

Such plates or layers are, for instance, utilized for the inventive forming of raw laminar elastomeric blade products. It has been found that even the strength in the lengthwise direction is sufficient owing to the improved uniformity since there is attained a uniform force distribution. Therefore, an elastomeric blade equipped with such fibers can exhibit improved wear resistance since there is available a larger surface for the adhesion between the rubber and the fibers. The rupture or breaking elongation attained with the inventive fiber layers in the transverse direction is considerably more advantageous for the behavior of the elastomeric blade than the considerable higher rupture elongation which prevails in the case of conventionally manufactured elastomeric blades, since with the last mentioned elastomeric blades there oftentimes is present too great an elasticity which is disadvantageous.

Example 2

In analogous manner as in Example 1 a rubber mixture formed on the basis of natural rubber and oil extended styrene butadiene rubber is mixed with fibers. The shorter the fiber pieces within the polymeric material containing the fibers, the greater the density of fibers within the polymeric material in order to achieve a desired modulus of elasticity. The greater the density of fiber filling in the polymeric material, results in a greater, or higher, modulus of elasticity. However, the mixture also becomes stiffer and is more difficult to work, and in the completely vulcanized condition generally produces an increased heat development. On the other hand, the modulus of elasticity also increases with the length of the fiber pieces at the polymeric material. An elastic modulus, or modulus of elasticity, is a number that measures an object or substance's resistance to being deformed elastically (i.e., non-permanently) when a force is applied to it. The elastic modulus of an object is defined as the slope of its stress-strain curve in the elastic deformation region. A stiffer material will have a higher elastic modulus. An elastic modulus has the form:

$$\lambda \stackrel{def}{=} \frac{\text{stress}}{\text{strain}}$$

where stress is the force causing the deformation divided by the area to which the force is applied and strain is the ratio of the change in some length parameter caused by the deformation to the original value of the length parameter. If stress is measured in pascals, then since strain is a dimensionless quantity, the units of $\lambda$ will be pascals as well.

The average length of the fibers used in practicing the invention as disclosed herein is generally approximately in a range of 8 to 80 millimeters. In the case of high viscosity rubber mixtures it is approximately in the range of 15 to 40 millimeters and in the case of liquid rubber preferably can be in an amount in the range of 40 to 75 millimeters. Finally, it is mentioned that either before and/or during and/or after the flow operation the section or portion of the molded article not subjected to such flow operation can be prevulcanized.

The term "fibers" as used herein is employed in its broader sense and generally is intended to encompass not only fibers as such, but also yarns, threads, filaments, and the like.

Other embodiments and applications (FIGS. 12-13) of elastomeric blades can include conveyance blades or flights embedded with fibers either through an extrusion mixture having a random orientation of fibers or a laminated configuration comprising layers of rubber and fibers.

Figure 12:
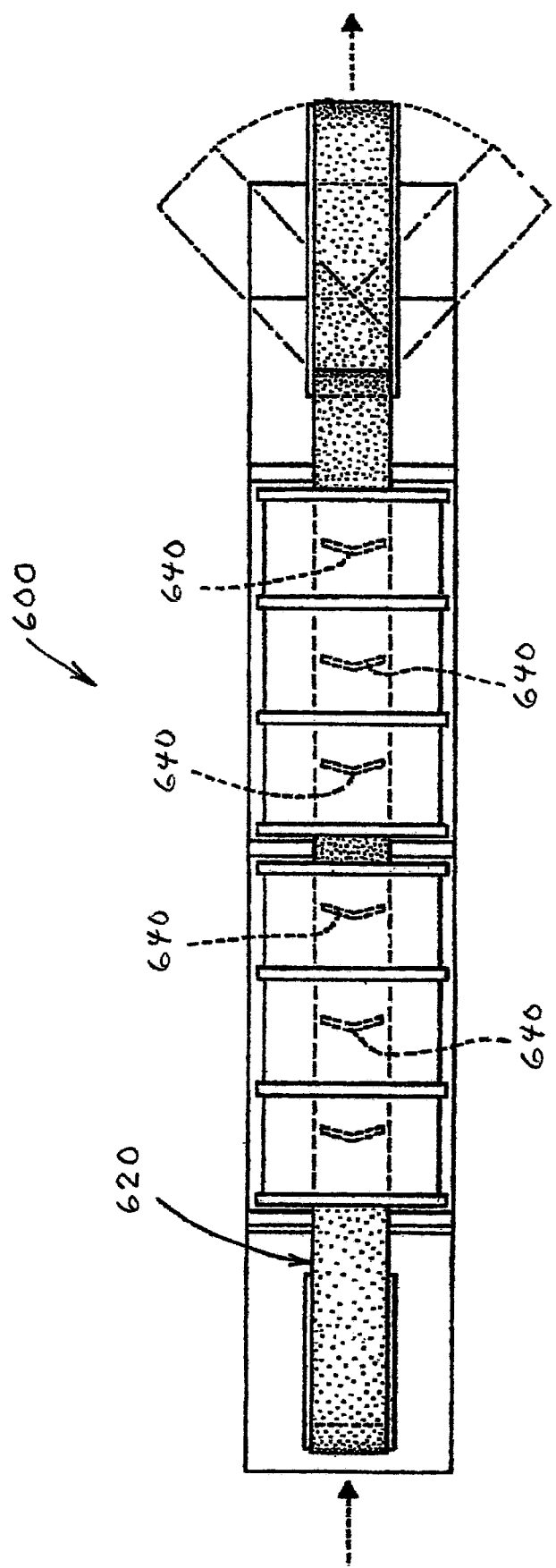

As shown in FIG. 12, a means 600 for selectively diverting ballast from a conveyor belt 620 into a selected one of a plurality of drums can include a plurality of support members, each mounted to the first frame within one of the drums and extending vertically from the frame over the first conveyor. At least one elastomeric conveyance blade 640 (i.e. formed as described above) is mounted to each support member for selected downward extension therefrom. When fully extended, each conveyance blade 640 is proximal to the upper surface of the first conveyor 620, whereby ballast conveyed thereon is diverted by the conveyance blade 640 from the first conveyor 620 to the lower portion of the casing. Each conveyance blade 640 can be individually operated and replaced to facilitate the loading of selected drums.

Figure 13:
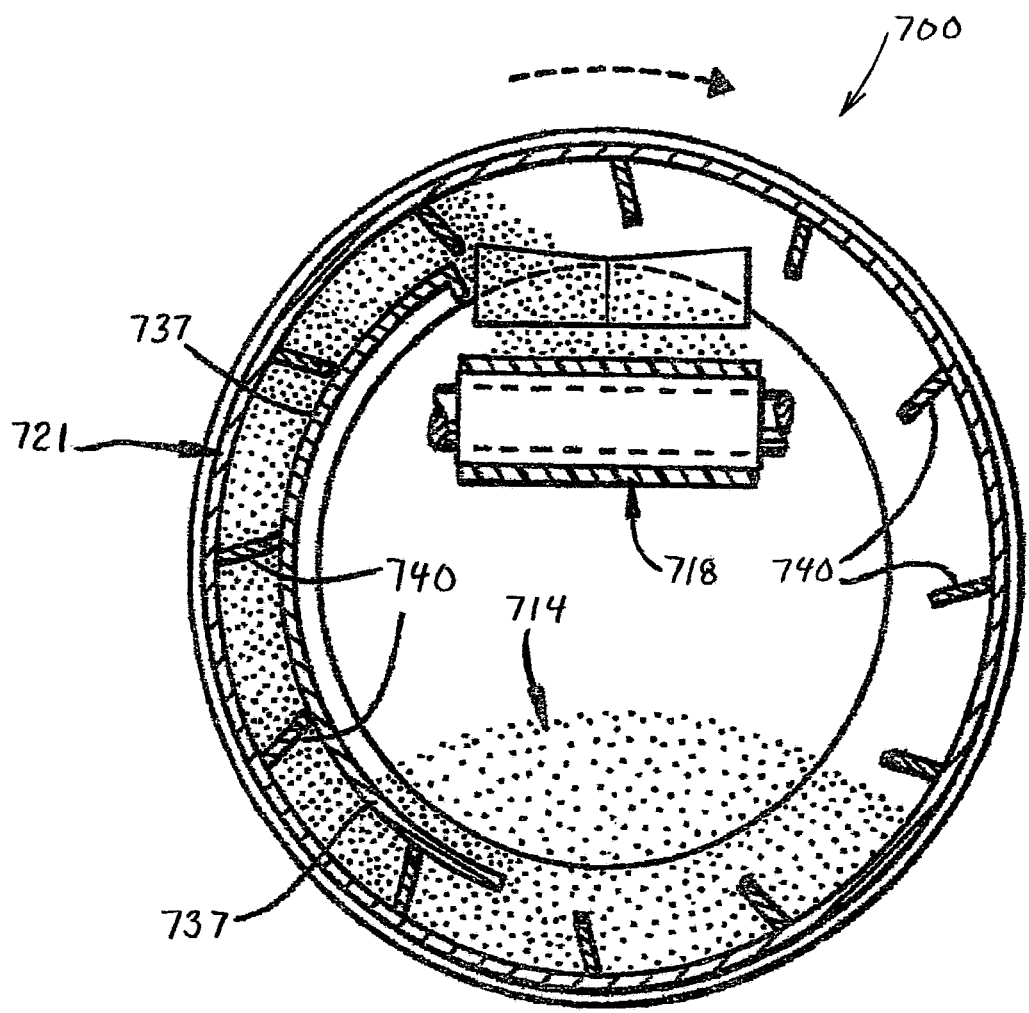
FIG. 13 shows another variety of elastomeric ballast conveyance blades.

Elastomeric conveyance blades or flights 740 can be used, for example, in a spaced spiral configuration 700 to move and convey ballast from a drum container. As shown in FIG. 13, a drum 721, when rotated, carries ballast 714 on the flights 740 in an upward direction. The predetermined angular offset of the flights 740 from perfect radial extension facilitate the lifting of the ballast 714 above the first conveyor 718, whereupon reaching a predetermined point, the ballast 714 is gravitationally dumped from the flights 740 onto the first conveyor 718. The arcuate plate 737 prevents the ballast 714 from falling from the flights 740 before reaching the predetermined point above the first conveyor 718. The ballast 714 comprising gravel, broken stone, slag, etc., can be placed, for example, between and under the ties of railroad lines to give stability. It is to be appreciated, that the flexible elastomeric flights 740, or terminal ends therefor, provide for an enhanced conveyance of ballast, whereby a 'wiper' action is incorporated as the flights 740 move against the arcuate plate 737. It is also to be appreciated, that the elastomeric nature of the flights 740, or terminal ends, reduces vibration and wear of the flights 740 and arcuate plate 737. The reduced vibration also enhances user operation. The 'wiper' action also enables conveyance of smaller particulates of ballast.

The conveyance blades can include a series of tines or teeth formed into the edges (not illustrated). The mechanism can include a series of blades which can be convergingly tapered toward a centerline and adapted to be equipped with a plurality of removable elastomeric tines. Alternatively, the tines can comprise steel ripper tines that are provided with elastomeric tips at their distal ends. This can provide a mechanism which is aggressive for fracturing compacted and harder material, while allowing the ends to convey smaller and softer material. This type of arrangement allows for the tines to be individually replaced. The tines or teeth can be formed by water jets cutting the elastomeric blades into the desired shape. In one exemplary embodiment, the elastomeric blades can comprise 3 to 4 foot sections, and 1 to 4 inches in thickness. The elastomeric blades, vanes, or flights can be used to convey material out of a truck or ballast 'regulator' for depositing said material at a desired rate and location.

Figure 14:
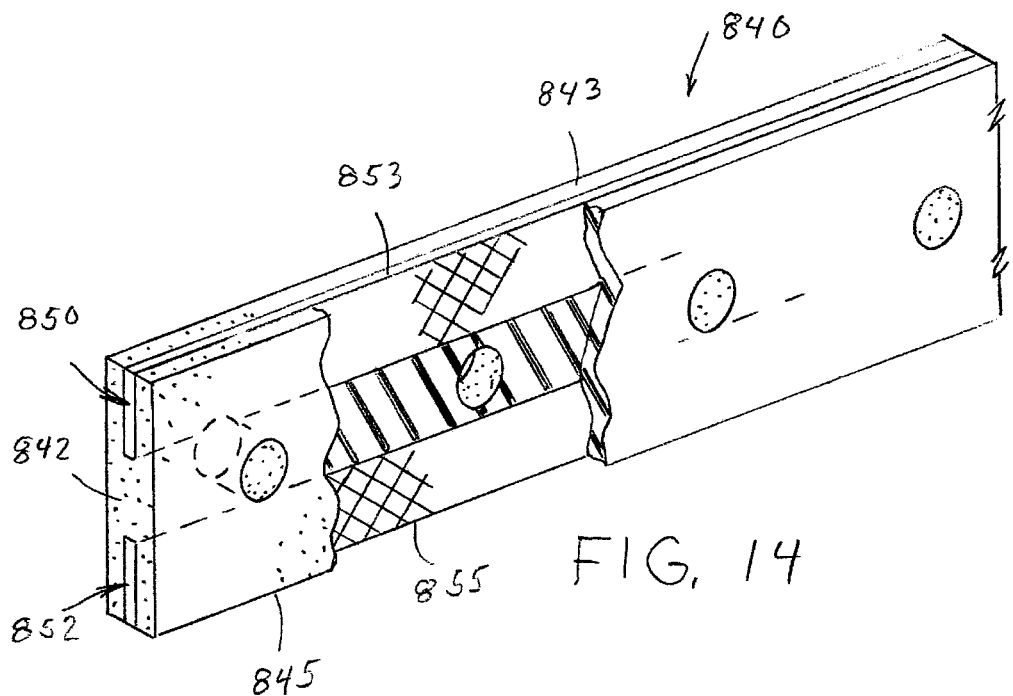
FIG. 14 shows another embodiment of an elastomeric blade including two embedded metal reinforcements.
Figure 15:
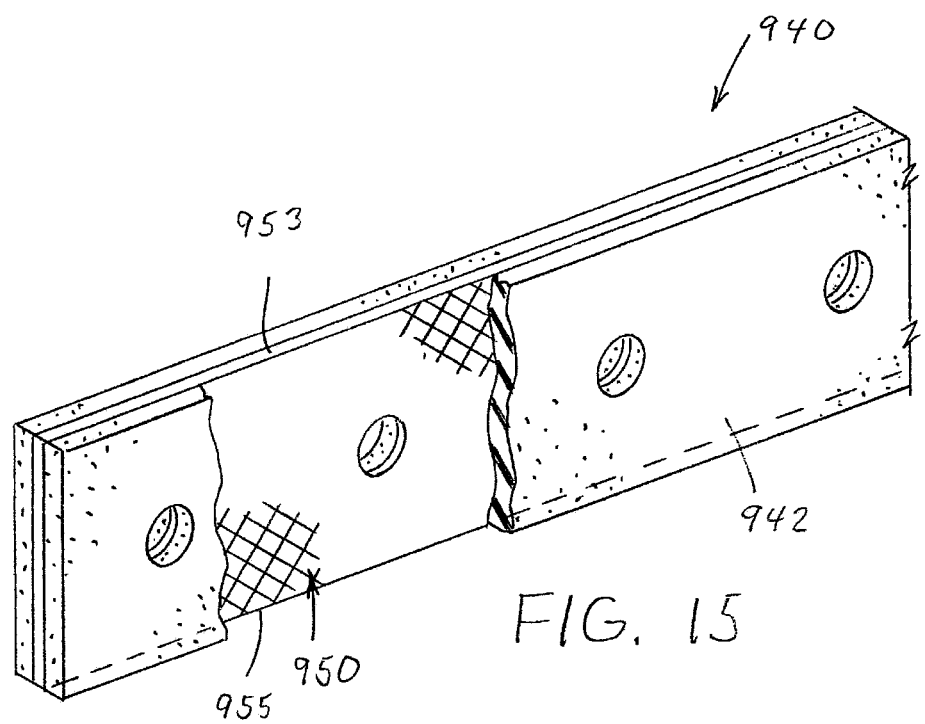
FIG. 15 shows an elastomeric blade having a single embedded metal reinforcement.

Referring now to FIG. 14, it is a further object of the present invention to provide an elastomeric blade 840, and method of forming same, comprising at least a first rubber, or similar, layer 842 having an upper surface 843 and a lower surface 845 and at least one reinforcement layer or insert 850, 852 embedded in the elastomeric blade 840. The integrated reinforcement insert(s) 850, 852 can comprise scraper elements of partial width having working edges 853, 855, respectively (FIG. 14). The inserts 850, 852 can be formed from expanded metal, metal grating, and/or shape perforated sheet steel and can be integrated during the vulcanization of the elastomeric blade 840. In another embodiment of an elastomeric blade 940 (FIG. 15), the integrated reinforcement layer can comprise a full insert 950 (FIG. 15) wherein the molded rubber includes an integrated scraper element of substantially the entire width of the molded rubber 942. The scraper element or insert 950 includes two working edges 953, 955 and can be comprised of expanded metal, metal grating, mesh, screen, diamond plating, and/or shape perforated sheet steel. It is to be appreciated that the elastomeric blades 840, 940 can be flipped to expose alternatively each working edge 843, 845, 953, 955, respectively, of the blades 840, 940.

Figure 16:
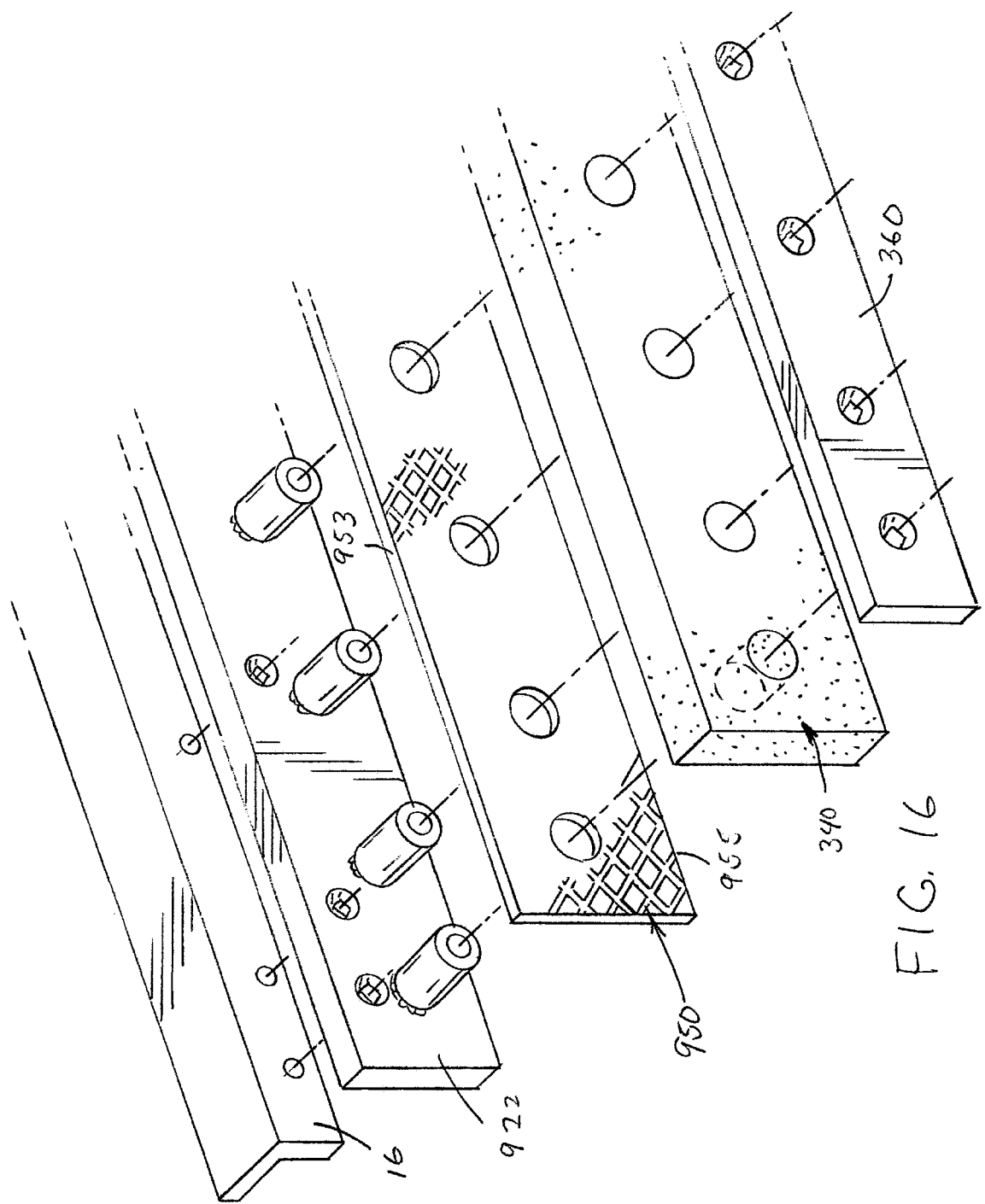
FIG. 16 shows an arrangement of plow wear parts including a separate backer scraper blade reinforcing the elastomeric blade component.
Figure 17:
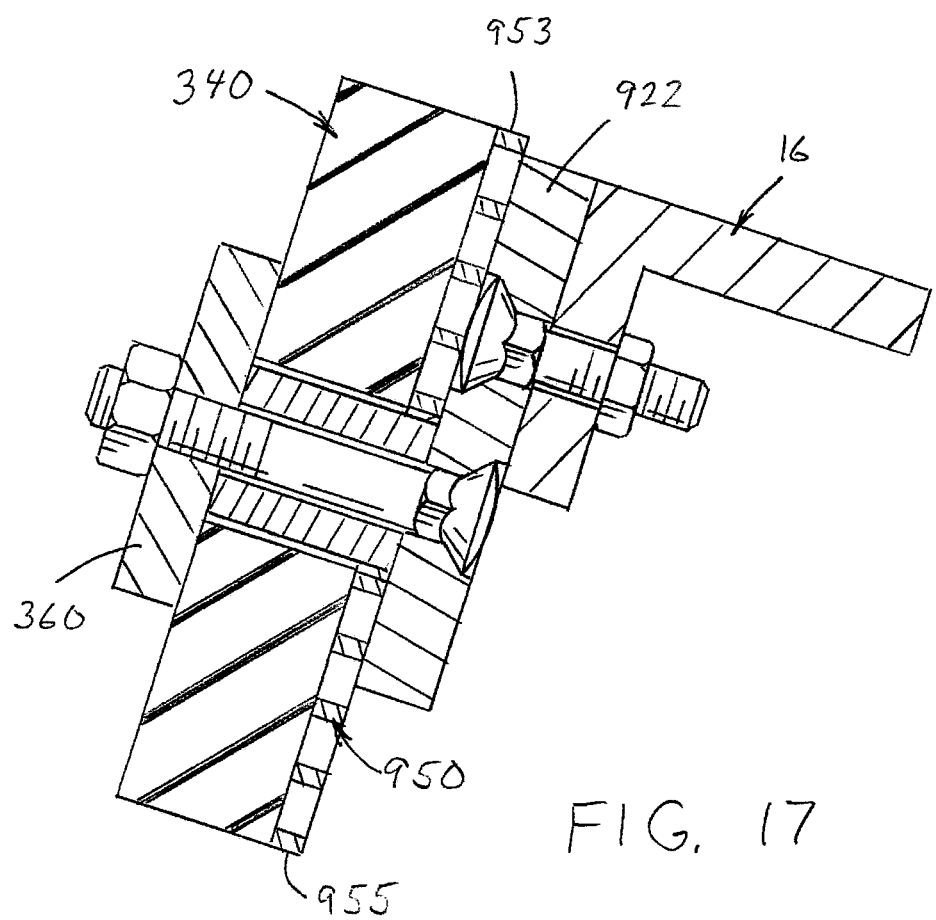
FIG. 17 is a side view of the assembled components of FIG. 17.

Referring now to FIGS. 16 and 17, the scraper blade or reinforcement layer 950 can be separately provided and mounted between an elastomeric blade 340 and an adapter blade 922. In this manner, the scraper blade 952 provides 'downstream' support to the full width and length of the elastomeric blade 340 (FIG. 17).

Figure 18:
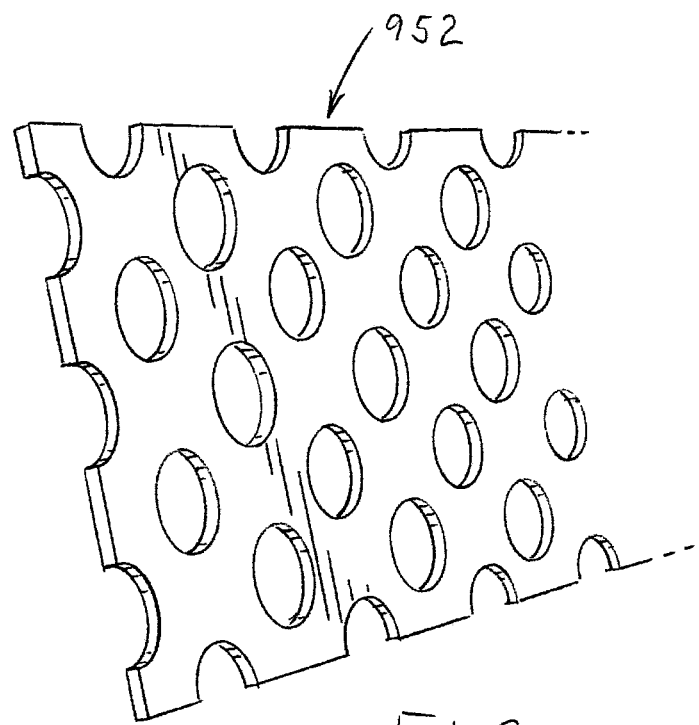
FIG. 18 is an exemplary reinforcement metal scraper blade including shape perforated sheet metal.

FIG. 18 reflects one exemplary variety of a scraper blade or a reinforcement layer 952. FIG. 18 reflects an exemplary diamond plating or shape perforated metal reinforcement layer.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A reinforced elastomeric blade for presenting to a road surface, the reinforced elastomeric blade comprising:
   an elastomeric blade including a plurality of laminated layers;
   said laminated layers including at least two layers of elastomeric material separated by at least a first layer of reinforcing fibers;
   said at least two layers of elastomeric material and said at least first layer of reinforcing fibers moldable and curable in a mold cavity to form a monolithic structure; and,
   said at least first layer of reinforcing fibers coextensive with a bottom surface of one elastomeric layer and coextensive with a top surface of another elastomeric layer;
   wherein the reinforced elastomeric blade resists wear on an associated plow.

2. The reinforced elastomeric blade of claim 1, further comprising:
   at least a third layer of elastomeric material and at least a second layer of reinforcing fibers; and,
   wherein said reinforcing layers are laminated between said elastomeric layers.

3. The reinforced elastomeric blade of claim 2, further comprising:
   said first layer of reinforcing fibers are oriented in a first direction;
   said second layer of reinforcing fibers are oriented in a second direction; and,
   wherein said first direction is different from said second direction.

4. The reinforced elastomeric blade of claim 1, wherein said reinforcing fibers are in random orientation at a shoulder region of said reinforced elastomeric blade.

5. The reinforced elastomeric blade of claim 1, wherein said at least first layer of reinforcing fibers is a preform web material having fibers.

6. The reinforced elastomeric blade of claim 5, wherein said reinforcing fibers are oriented in a peripheral direction of said web.

7. The reinforced elastomeric blade of claim 1, wherein said reinforcing fibers are oriented in a peripheral direction of said first layer of reinforcing fibers.

8. The reinforced elastomeric blade of claim 1, wherein said reinforcing fibers are oriented differently at different elastomeric blade sections.

9. The reinforced elastomeric blade of claim 1, wherein said reinforcing fibers are oriented in a crosswise oriented assembly.

10. The reinforced elastomeric blade of claim 1 further comprising exterior walls formed of said at least two layer of elastomeric material, wherein said exterior walls includes reinforcing fibers embedded within said elastomeric material.

11. The reinforced blade of claim 10, wherein at least one of said exterior walls includes a textured surface for increased surface area adhesion to an adjacent mating surface of an associated clamp bar or adapter blade.

12. The reinforced elastomeric blade of claim 1, wherein an overall wear of said reinforced elastomeric blade is up to 50% of an initial width of said reinforced elastomeric blade.

13. The reinforced elastomeric blade of claim 1 further comprising two mounting positions including:
    a first position including a first edge presenting to a road surface;
    a second position presenting a second edge to the road surface;
    wherein said elastomeric blade is operative to be dismounted from, reversed, and remounted to an associated plow blade edge system.

14. The reinforced elastomeric blade of claim 12, wherein each of said first and second edges can wear up to 25% of an overall initial width of said reinforced elastomeric blade.

15. A reinforced elastomeric blade for resisting wear from contact between an associated plow blade and a road surface, the reinforced elastomeric blade comprising:
    an elastomeric blade including a plurality of laminated layers, each of said laminated layers formed of a rubber mixture with fibers:
    the elastomeric blade for adhering to an associated part of a plow blade edge system.

16. A reinforced elastomeric blade for use with a plow blade edge system, the reinforced elastomeric blade comprising:
    at least a first layer of reinforcing fibers embedded within at least two layers of elastomeric material separated by;
    said at least two layers of elastomeric material and said at least first layer of reinforcing fibers moldable and curable in a mold cavity to form a monolithic structure; and,
    said at least first layer of reinforcing fibers coextensive with a bottom surface of one elastomeric layer and coextensive with a top surface of another elastomeric layer.

17. The reinforced elastomeric blade of claim 16, further comprising:
    at least a third layer of elastomeric material and at least a second layer of reinforcing fibers; and,
    wherein said reinforcing layers are embedded within said elastomeric layers.

18. The reinforced elastomeric blade of claim 16, further comprising:
    said first layer of reinforcing fibers are oriented in a first direction;
    said second layer of reinforcing fibers are oriented in a second direction; and,
    wherein said first direction is different from said second direction.

19. The reinforced elastomeric blade of claim 16 further comprising a beveled or chamfered arrangement, wherein each said layer each include a different width relative to another layer.

20. The reinforced elastomeric blade of claim 1 further comprising a beveled or chamfered arrangement, wherein said laminated layers each include a different width relative to another layer.

* * * * *